(12) United States Patent
Smith et al.

(10) Patent No.: US 7,961,135 B2
(45) Date of Patent: Jun. 14, 2011

(54) SYSTEMS AND METHODS FOR AIR TRAFFIC SURVEILLANCE

(75) Inventors: Mark D. Smith, Glendale, AZ (US); Michael F. Tremose, Glendale, AZ (US)

(73) Assignee: Aviation Communication & Surveillance Systems LLC, Phoenix, AZ (US)

( * ) Notice: Subject to any disclaimer, the term of this patent is extended or adjusted under 35 U.S.C. 154(b) by 334 days.

(21) Appl. No.: 12/114,621

(22) Filed: May 2, 2008

(65) Prior Publication Data

US 2010/0039310 A1 Feb. 18, 2010

Related U.S. Application Data

(60) Provisional application No. 60/927,444, filed on May 2, 2007.

(51) Int. Cl.
*G01S 13/93* (2006.01)
(52) U.S. Cl. ............... 342/29; 342/36; 342/52; 342/53; 342/54
(58) Field of Classification Search ............... 342/29–32, 342/36–38, 52–59
See application file for complete search history.

(56) References Cited

U.S. PATENT DOCUMENTS

| | | | | |
|---|---|---|---|---|
| 3,714,651 A | * | 1/1973 | Lyon | ............... 342/29 |
| 4,139,848 A | | 2/1979 | Maxwell, Jr. | |
| 4,196,474 A | * | 4/1980 | Buchanan et al. | ............ 701/301 |
| 5,629,691 A | * | 5/1997 | Jain | ............... 340/961 |
| 5,710,648 A | | 1/1998 | Frigo | |
| 6,208,284 B1 | | 3/2001 | Woodell | |
| 6,211,811 B1 | * | 4/2001 | Evers | ............... 342/36 |
| 6,252,525 B1 | | 6/2001 | Philiben | |
| 6,469,660 B1 | | 10/2002 | Horvath | |
| 6,542,810 B2 | | 4/2003 | Lai | |
| 6,720,920 B2 | | 4/2004 | Breed et al. | |
| 6,795,772 B2 | | 9/2004 | Lin et al. | |
| 7,006,032 B2 | | 2/2006 | King | |
| 7,864,096 B2 | * | 1/2011 | Stayton et al. | ............... 342/29 |
| 2007/0252748 A1 | * | 11/2007 | Rees et al. | ............... 342/29 |
| 2010/0039310 A1 | * | 2/2010 | Smith et al. | ............... 342/29 |
| 2010/0253566 A1 | * | 10/2010 | Ino | ............... 342/32 |
| 2010/0283662 A1 | * | 11/2010 | Fox et al. | ............... 342/53 |

OTHER PUBLICATIONS

Swart, P.J.F.; Nieuwkerk, L.R.; , "Collision Avoidance Radar Able to Differentiate Objects," Microwave Conference, 1997. 27th European, vol. 1, no., pp. 45-50, Sep. 8-12, 1997.*

Borghys et al.I; "Multi-Level Data Fusion for the Detection of Targets using multi-spectral Image Sequences"; Optical Engineering; pp. 1-14; 37(2), 1998.

(Continued)

*Primary Examiner* — John B Sotomayor
(74) *Attorney, Agent, or Firm* — Allen J. Moss; Squire, Sanders & Dempsey (US) L.L.P.

(57) ABSTRACT

A collision avoidance system according to one aspect of the present invention comprises a user interface, a plurality of sensors, and a computer system in communication with the user interface and the plurality of sensors. The computer system includes a processor and a memory storing instructions that, when executed by the processor, cause the processor to receive data pertaining to a target from one or more sensors of the plurality of sensors, determine a position of the target based on the data from the one or more sensors, and present (through the user interface) the position of the target using one or more visual indicators that identify the one or more sensors.

40 Claims, 7 Drawing Sheets

OTHER PUBLICATIONS

Kuttikkad et al.; "Registration and Exploitation of Multi-pass Airborne Synthetic Aperture Radar Images"; University of Maryland, Computer Vision Laboratory, Center for Automation Research, Apr. 1997; College Park, MD, USA.

Lacher et al.; "Unmanned Aircraft Collision Avoidance-Technology Assessment and Evaluation Methods"; pp. 1-10; The MITRE Corporation; McLean, VA, USA.

La Scala et al.; "Multi-region Viterbi Data Association Tracking for Over-the-Horizon Radar"; Cooperative Research Centre for Sensor Signal and Information Processing; Oct. 199; pp. 1-25; CSSIP, University of Melbourne; Mawson Lakes, Australia.

Okello et al.; "Tracker: A Sensor Fusion Simulator for Generalised Tracking"; Cooperative Research Centre for Sensor Signal and Information Processing; pp. 1-6; CCSSIP; Mawson Lakes, Australia.

Verlinde et al.; "Data Fusion for Long Range Target Acquisition"; In 7th Symposium on Multi-Sensor Systems and Data Fusion for Telecommunications, Remote Sensing and Radar, Lisbon, 1997, NATO.

Verlinde et al.; "Decision Fusion Using a Multi-Linear Classifier"; In proceedings of the International Conference on Multisource-Information Fusion, vol. 1, pp. 47-53; Las Vegas, NV, USA, Jul. 1998.

Verlinde et al.: "A Multi-Level Data Fusion Approach for Gradually Upgrading the Performances of Identity Verification Systems"; In B. Dasarathy, editor, Sensor Fusion: Architectures, Algorithms and Applications III, vol. 3719, Orlando FL, USA; Apr. 1999.

Zeitlin et al.; "Collision Avoidance for Unmanned Aircraft: Proving the Safety Case"; Paper #MP060219; Oct. 2006; The MITRE Corporation Center for Advanced Aviation Systems Development, McLean, VA, USA and MIT Lincoln Laboratory, MIT, Lexinton, MA, USA.

* cited by examiner

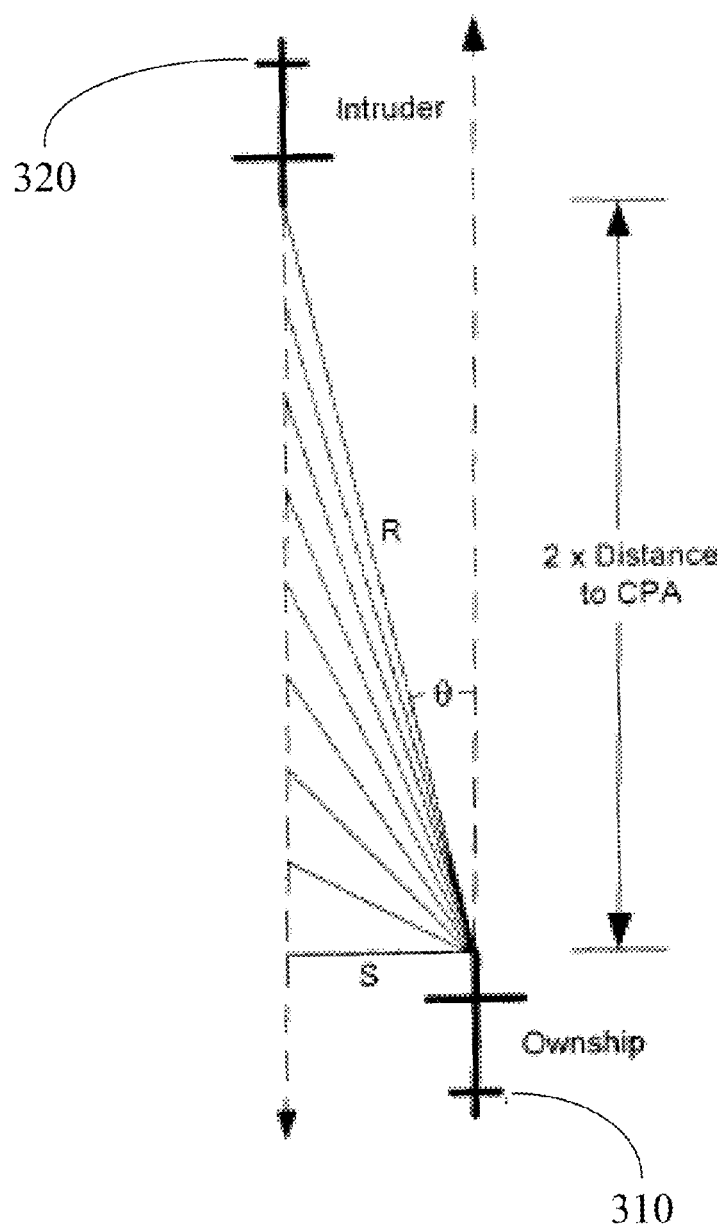
FIG. 3. Bearing Change as a Function of Range

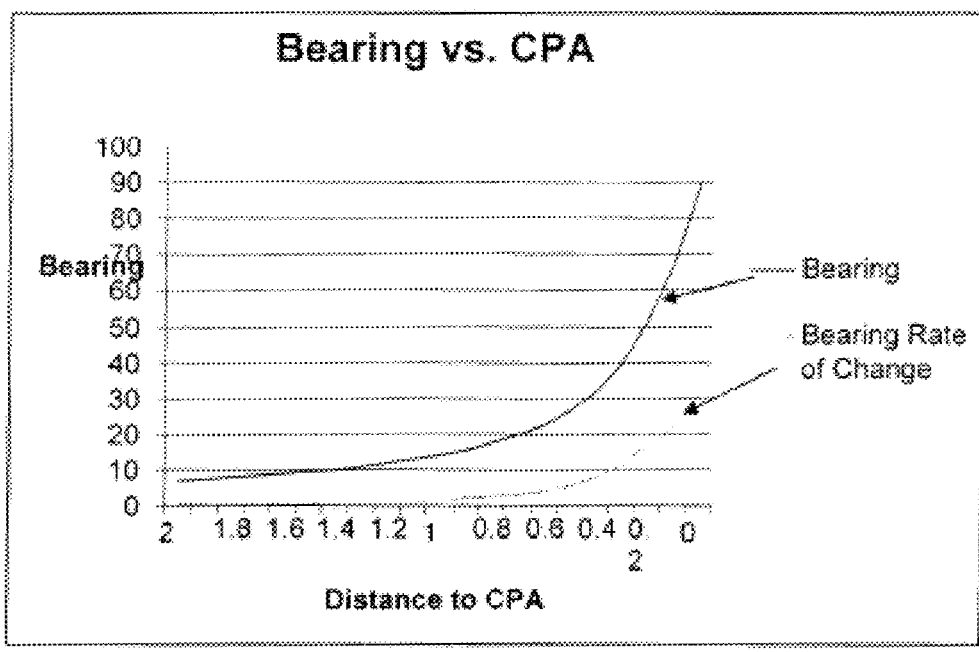
FIG. 4. Graph of Bearing and Bearing Rate vs. Closest Point of Approach

| Icon Type | | Symbol | |
|---|---|---|---|
| Non Threat Traffic - Transponder Only | ◇ | Cyan Unfilled Diamond | 505 |
| Traffic Advisory - Transponder Only | ● | Amber Filled Circle | 510 |
| Resolution Advisory - Transponder Only | ■ | Red Filled Square | 515 |
| Proximity Traffic - Transponder Only | ◆ | Cyan Filled Diamond | 520 |
| Threat Traffic - Radar Only | ▲ | Cyan Filled Arrow-Head (Points along Target Track) | 525 |
| Resolution Advisory - Radar Only | ▲ | Red Filled Arrow-Head (Points along Target Track) | 530 |
| Non Threat Traffic - Transponder & Radar | ◇ | Outlined - Cyan Unfilled Diamond | 535 |
| Traffic Advisory - Transponder & Radar | ◉ | Outlined - Amber Filled Circle | 540 |
| Resolution Advisory - Transponder & Radar | ■ | Outlined - Red Filled Square | 545 |
| Proximity Traffic - Transponder & Radar | ◆ | Outlined - Cyan Filled Diamond | 550 |

FIG. 5 One Embodiment of Symbology for a Multi-Functional Sense-and-Avoid System

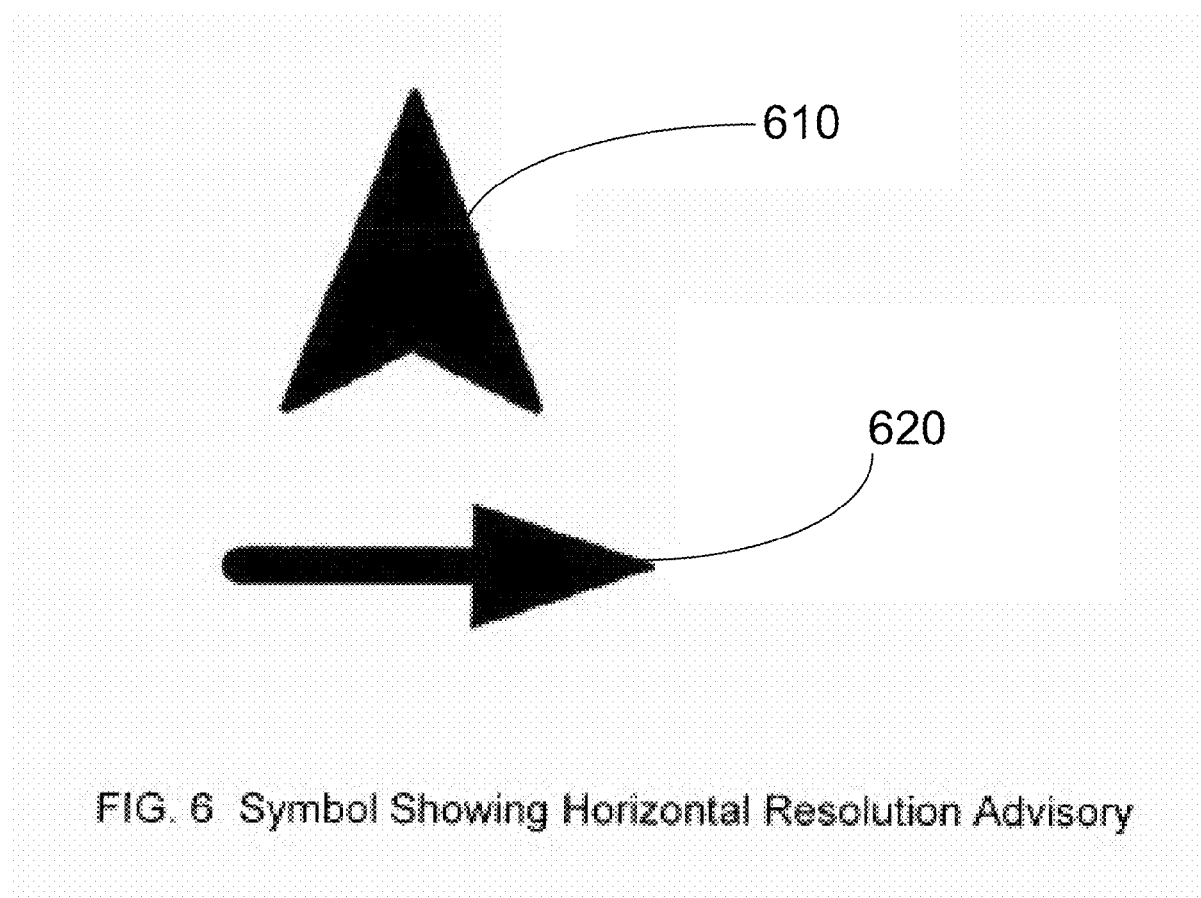
FIG. 6 Symbol Showing Horizontal Resolution Advisory

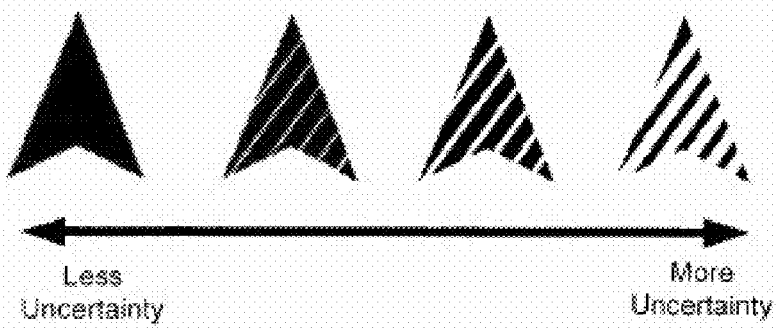

FIG. 7A Symbology Variations Depicting
Uncertainty In Bearing /Heading / Location As
Indicated by Striping/Crosshatch

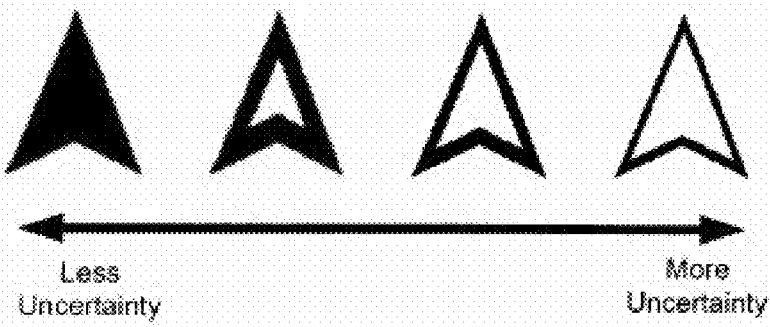

FIG. 7B Symbology Variations Depicting
Uncertainty In Bearing /Heading / Location As
Indicated by Extent of Central Void Area

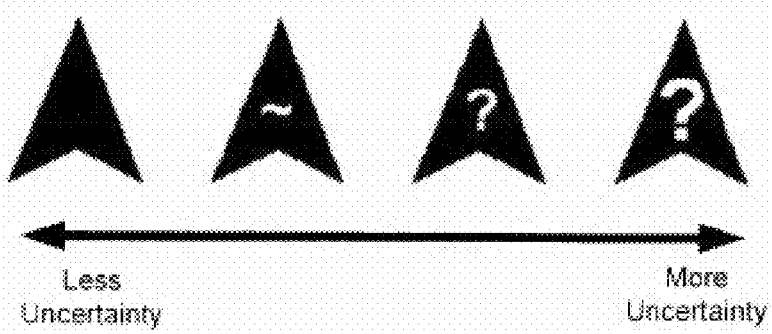

FIG. 7C Symbology Variations Depicting
Uncertainty In Bearing /Heading / Location As
Indicated by Textual Elements

SYSTEMS AND METHODS FOR AIR TRAFFIC SURVEILLANCE

CROSS-REFERENCE TO RELATED APPLICATIONS

This application claims priority from U.S. Provisional Application. No. 60/927,444, filed May 2, 2007 and entitled "METHOD AND APPARATUS FOR AIRCRAFT SURVEILLANCE VIA MULTIFUNCTIONAL SENSOR," and from U.S. patent application Ser. No. 12/011,200 filed Jan. 23, 2008 and entitled "SYSTEMS AND METHODS FOR MULTI-SENSOR COLLISION AVOIDANCE," both of which are incorporated herein by reference in their entirety.

DESCRIPTION OF THE INVENTION

1. Field of the Invention

The present invention relates to systems and methods for air traffic surveillance, and more particularly, to the display of air traffic detected by multiple sensor systems using a collision avoidance system.

2. Background of the Invention

An aircraft with a collision avoidance system (CAS) can provide a pilot with information that may enhance the pilot's awareness of situations pertaining to the aircraft (e.g., situational awareness). For example, a CAS display may show a symbol for the pilot's own aircraft (also known as "own ship") as well as symbols for other aircraft detected within the surveillance volume for the CAS, thereby providing the pilot with situational awareness. A CAS may also provide situational awareness by providing information on intruding targets (such as other aircraft). A CAS may provide traffic advisories (TAs) and resolution advisories (RAs) to the pilot regarding such traffic. An RA is information that may be provided by the CAS to the pilot to recommend a maneuver to increase separation relative to an intruding aircraft. RA information typically consists of a visual indication, changing a displayed symbol for the intruding aircraft, and an aural indication, an announcement played on a CAS speaker recommending a maneuver, such as "climb climb." Before an RA is provided, the CAS may typically provide a TA, information that does not recommend a maneuver to the pilot, but does indicate that an intruding aircraft has reached a predefined condition representing some collision risk. TA information typically consists of a visual indication, changing a displayed symbol for the intruding aircraft, and an aural indication, an announcement played on the CAS speaker consisting of "traffic traffic."

As used herein, a CAS refers to any aircraft system that may use a signal from at least one of the air traffic control radar beacon system (ATCRBS), air traffic control mode S (ATC mode S) and the automatic dependent surveillance-broadcast (ADS-B) for airborne surveillance and/or collision avoidance functions. Such a CAS includes, but is not limited to, any version of any system that may be referred to as an airborne collision avoidance system (ACAS), a traffic collision avoidance system (TCAS) and an enhanced traffic alert and collision avoidance system (ETCAS).

TCAS, for example, is an avionics system which is designed to reduce the likelihood of mid-air collisions between aircraft. Through TCAS, the airspace around an aircraft is monitored independent of air traffic control, and pilots are warned of the presence of other aircraft which may present a threat of mid air collision. TCAS has been proven and accepted to be an effective tool in the detection of cooperative traffic in airspace surrounding aircraft. However, non-cooperative traffic (e.g., aircraft not sufficiently equipped or unable to operate in a TCAS environment) is invisible to conventional TCAS, and the pilot's eyes are the final layer of protection from collision with intruding aircraft. Unfortunately, due to human factors, degradation in visibility due to weather, and aircraft equipment limitations, pilot visibility may not be sufficiently effective in preventing mid-air collisions with intruders.

Additionally, conventional collision avoidance systems may not be able to adequately present information to a pilot (or other member of the flight crew) regarding an intruding target when such information is based on multiple sensors, particularly when such information is based on data from multiple disparate sensor systems, such as optical sensors, acoustic sensors, active radar sensors, and passive radar sensors. For example, conventional systems may be unable to convey which sensor(s) are being used to detect the target, the level of accuracy of information (such as the position, heading, and/or bearing of the target) based on data from the sensor(s), the level of threat posed by the target, whether the target is cooperative or non-cooperative, and/or a collision avoidance maneuver the pilot should implement to avoid the target. These and other issues are addressed by the present invention.

SUMMARY OF THE INVENTION

Systems and methods of the present invention allow a pilot or other flight crew member to quickly and easily gather information regarding a target. A method according to one aspect of the present invention includes receiving, by a Collision Avoidance System (CAS), data pertaining to a target from one or more sensors of a plurality of sensors. The CAS determines a position of the target based on the data from the one or more sensors and presents the position of the target using one or more visual indicators that identify the one or more sensors. A pilot is thus able to quickly determine the position of an intruding target aircraft, as well as the sensor(s) which are providing data on the target.

A collision avoidance system according to another aspect of the present invention comprises a user interface, a plurality of sensors, and a computer system in communication with the user interface and the plurality of sensors. The computer system includes a processor and a memory storing instructions that, when executed by the processor, cause the processor to receive data pertaining to a target from one or more sensors of the plurality of sensors, determine a position of the target based on the data from the one or more sensors, and present (through the user interface) the position of the target using one or more visual indicators that identify the one or more sensors.

A method according to another aspect of the present invention includes receiving data pertaining to a target from a plurality of sensors by a Collision Avoidance System (CAS). The CAS determines a position of the target based on the data from one or more sensors of the plurality of sensors and whether the target is a cooperative target or non-cooperative target. The CAS presents the position of the target using one or more visual indicators, wherein the one or more visual indicators further designate (a) which of the plurality of sensors provided data to determine the position of the target, and (b) whether the target is a cooperative target or non-cooperative target.

A collision avoidance system according to another aspect of the present invention comprises a user interface, a plurality of sensors, and a computer system in communication with the user interface and the plurality of sensors. The computer system comprises a processor and a memory storing instructions that, when executed by the processor, cause the processor to receive data pertaining to a target from the plurality of sensors, determine (a) a position of the target based on the data from one or more sensors of the plurality of sensors and (b) whether the target is a cooperative target or non-cooperative target. The memory further stores instructions cause the processor to present, through the user interface, the position of the target using one or more visual indicators, wherein the one or more visual indicators further designate: (a) which of the plurality of sensors provided data to determine the position of the target; and (b) whether the target is a cooperative target or non-cooperative target.

Both the foregoing summary and the following detailed description are exemplary and explanatory only and are not restrictive of the invention.

BRIEF DESCRIPTION OF THE DRAWINGS

A more complete understanding of the present invention may be derived by referring to the detailed description and claims when considered in connection with the following illustrative figures.

FIG. 3 depicts an exemplary bearing change as a function of range between own ship and an intruder in accordance with various aspects of the present invention.

FIG. 4 is an exemplary graph of bearing and bearing rate vs. closest point of approach in accordance with systems and methods consistent with the present invention.

FIG. 5 shows one embodiment of symbology for use with systems and methods of the present invention.

FIG. 6 illustrates an exemplary symbol arrangement showing a horizontal resolution advisory in accordance with systems and methods of the present invention.

FIGS. 7A, 7B, and 7C show various depictions of symbology as modified by a relative level of certainty in intruder-related flight information in accordance with systems and methods of the present invention.

DETAILED DESCRIPTION OF EXEMPLARY EMBODIMENTS

Exemplary System

Figure 1:
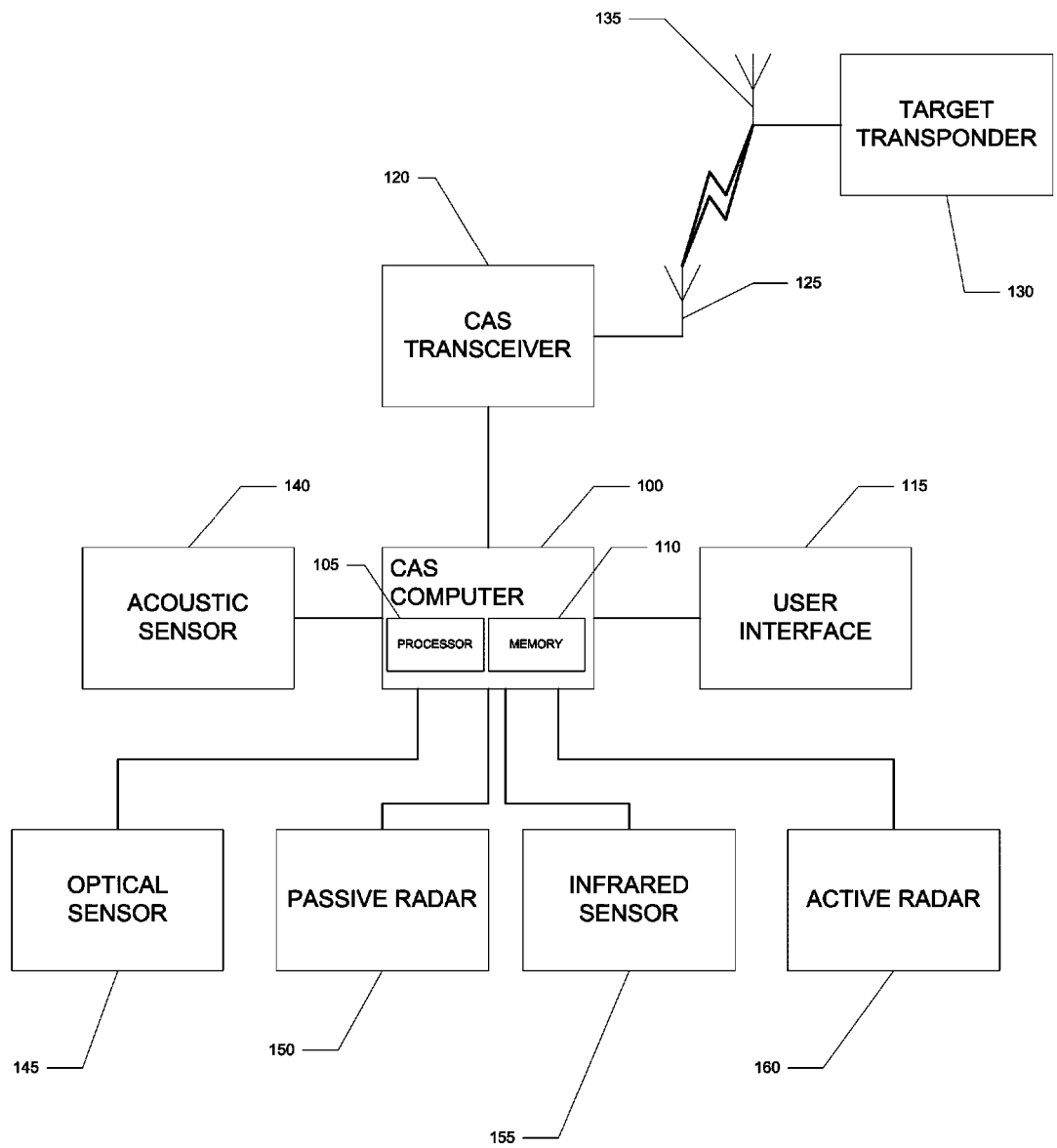
FIG. 1 is a block diagram depicting an exemplary system according to various aspects of the present invention.

An exemplary collision avoidance system for use in conjunction with the present invention is depicted in FIG. 1. This system may be used in conjunction with the method described in FIG. 2, as well as with any subset or combination of the elements thereof. The system in FIG. 1 may also be used in conjunction with any other suitable embodiments of systems and methods of the present invention.

The exemplary system depicted in FIG. 1 includes a CAS computer system 100 that comprises a processor 105 and a memory 110. The CAS computer 100 wirelessly communicates with one or more target transponders 130 using a CAS transceiver 120 via antennas 125 and 135. The CAS computer 100 receives input and provides output through the user interface 115. The CAS computer 100 in this exemplary embodiment is in communication with a plurality of sensor systems, including an acoustic sensor 140, an optical sensor 145, a passive radar system 150, an infrared sensor 155, and an active radar system 160. While the components in FIG. 1 are depicted as separate elements, it will be appreciated that any of the sensor systems (140, 145, 150, 155, 160) or other components in FIG. 1 can be implemented as separate, federated systems, or integrated with each other in any combination and in any suitable manner.

The functionality of the CAS computer 100 can be implemented in any suitable manner, such as through the processor 105 executing software instructions stored in the memory 110. Functionality may also be implemented through various hardware components storing machine-readable instructions, such as application-specific integrated circuits (ASICs), field-programmable gate arrays (FPGAs) and/or complex programmable logic devices (CPLDs). Systems according to aspects of the present invention may operate in conjunction with any desired combination of software and/or hardware components.

The processor 105 retrieves and executes instructions stored in the memory 110 to control the operation of the TCAS computer system 100. Any number and type of processor(s) such as an integrated circuit microprocessor, microcontroller, and/or digital signal processor (DSP), can be used in conjunction with the present invention. The memory 110 stores instructions, data, messages transmitted or received by the CAS computer 100, and any other suitable information. A memory 110 operating in conjunction with the present invention may include any combination of different memory storage devices, such as hard drives, random access memory (RAM), read only memory (ROM), FLASH memory, or any other type of volatile and/or nonvolatile memory.

The CAS transceiver 120 communicates with the CAS computer 100 and transmits and receives data via antenna 125. The CAS transceiver 120 can communicate with any desired system, device or entity, such as a target broadcasting signals from a transponder 130 through antenna 135. The CAS transceiver 120 may include any number and combination of hardware and/or software components. The CAS transceiver 120 may broadcast and receive signals in any number of desired formats and on any number of desired frequencies.

In one embodiment, the CAS transceiver 120 may transmit interrogations over an interrogation channel (e.g., 1030 MHz) to any target aircraft within the range of the transmission. The interrogation may request a reply from transponder-equipped aircraft within range of the transmission to provide their pertinent position and/or intent information. A target aircraft equipped with a transponder 130 may then reply over a reply channel (e.g., 1090 MHz) and provide information to the CAS transceiver 120. This information can include altitude, position, bearing, airspeed, aircraft identification, the intent of the aircraft, and other information pertaining to the target aircraft to assist the CAS computer 100 in tracking the target aircraft. As will be discussed in more detail below, the CAS computer 100 may utilize the data from a plurality of different sensors in combination with the information from the target transponder 130 to determine information pertaining to the target aircraft (such as its position, range, bearing, and/or heading) and/or to enhance the accuracy and confidence level of such information.

The CAS computer 100 provides and receives data through the user interface 115. The user interface 115 may include any number of input devices, such as a touch pad, a touch screen, or an alphanumeric keypad to allow a user to enter instructions and data into the CAS computer 100. The user interface 115 may include any desired output devices, such as a display screen to visually display information, as well as a speaker to provide auditory output. Various features of the user interface can be implemented in hardware, software, or a combination of the two.

Any type of information may be communicated through the user interface 115 by a pilot or other user, such as instructions to the CAS computer 100. Likewise, any type of data can be provided to a user through the user interface 115, such as the position, heading, bearing, speed, velocity, altitude, and/or range of a target aircraft, as well as the identity of the sensor(s) providing data regarding the target aircraft. As will be discussed in more detail below, the present invention may use visual indicators to allow a user to quickly determine the level of threat posed by a target, identify a collision avoidance maneuver (and the level of urgency for the collision avoidance maneuver), the level of accuracy associated with the determined position of the target, and whether the target is a cooperative target or non-cooperative target.

The CAS computer 100 may include (or be in communication with) any number of sensors, such as sensors 140, 145, 150, 155, and 160 depicted in FIG. 1. The acoustic sensor 140 detects sound waves from a target. Any type of acoustic sensor 140 may be used in conjunction with the present invention. The acoustic sensor 140 may be used to detect sound waves having any frequency, amplitude, or other characteristic. The acoustic sensor 140 may passively receive sound waves and/or actively transmit sound waves and monitor the reflected sound waves from the target. The acoustic sensor 140 may be used, for example, to detect sound waves emanating from (or reflected by) a target to determine the target's position, heading, range, bearing, identity (e.g., where a target has a unique acoustic signature), type (e.g., where a class of targets can be discerned from their acoustic signature), or other information.

The optical sensor 145 detects light waves. Any type of active and/or passive optical sensor 145 may be used in conjunction with the present invention. The optical sensor 145 may detect light waves having any frequency, amplitude, or other characteristic. The optical sensor 145 may detect light waves in the visible or non-visible spectrum. For example, the present invention may operate in conjunction with a sensor configured to detect light waves in a predetermined range of wavelengths, such as the infrared sensor 155, which detects light waves in the infrared spectrum.

The present invention may operate in conjunction with a passive radar system 150, as well as with an active radar system 160. The passive radar system 150 detects electromagnetic signals transmitted by third-parties and reflected from a target. The active radar system 160 transmits electromagnetic signals and detects their reflection from a target. Any desired type of passive radar system 150 and/or active radar system 160 may be used to provide the CAS computer 100 with information on a target in accordance with the present invention. For example, the present invention may operate in conjunction with an integrated radar that uses the standard communication transmissions of CAS or an own ship transponder to illuminate a target aircraft and receive a reflected signal back for processing. Such an integrated radar system may allow the existing antenna from the TCAS system to be used in a multi-sensory role (i.e., to receive signals transmitted from a target transponder as well as to receive reflected signals from targets). Such an integrated radar system could also allow the use of a transmitted CAS signals in a radar function to detect non-cooperative intruders.

In addition to the sensors depicted in FIG. 1, the present invention may operate in conjunction with a light detection and ranging (LIDAR) sensor, Automatic Dependent Surveillance-Broadcast (ADS-B) system, as well as any other sensor now known or later developed that is capable of providing information on a target. The sensors may be individual, federated systems. The sensors may also be combined with each other, the CAS, or any other desired system or device. Data provided by the sensors to the CAS computer system 100 may be in any desired format and contain any information. The CAS computer 100 may also be configured to configure and/or control any sensor it is in communication with.

Exemplary Method

Figure 2:
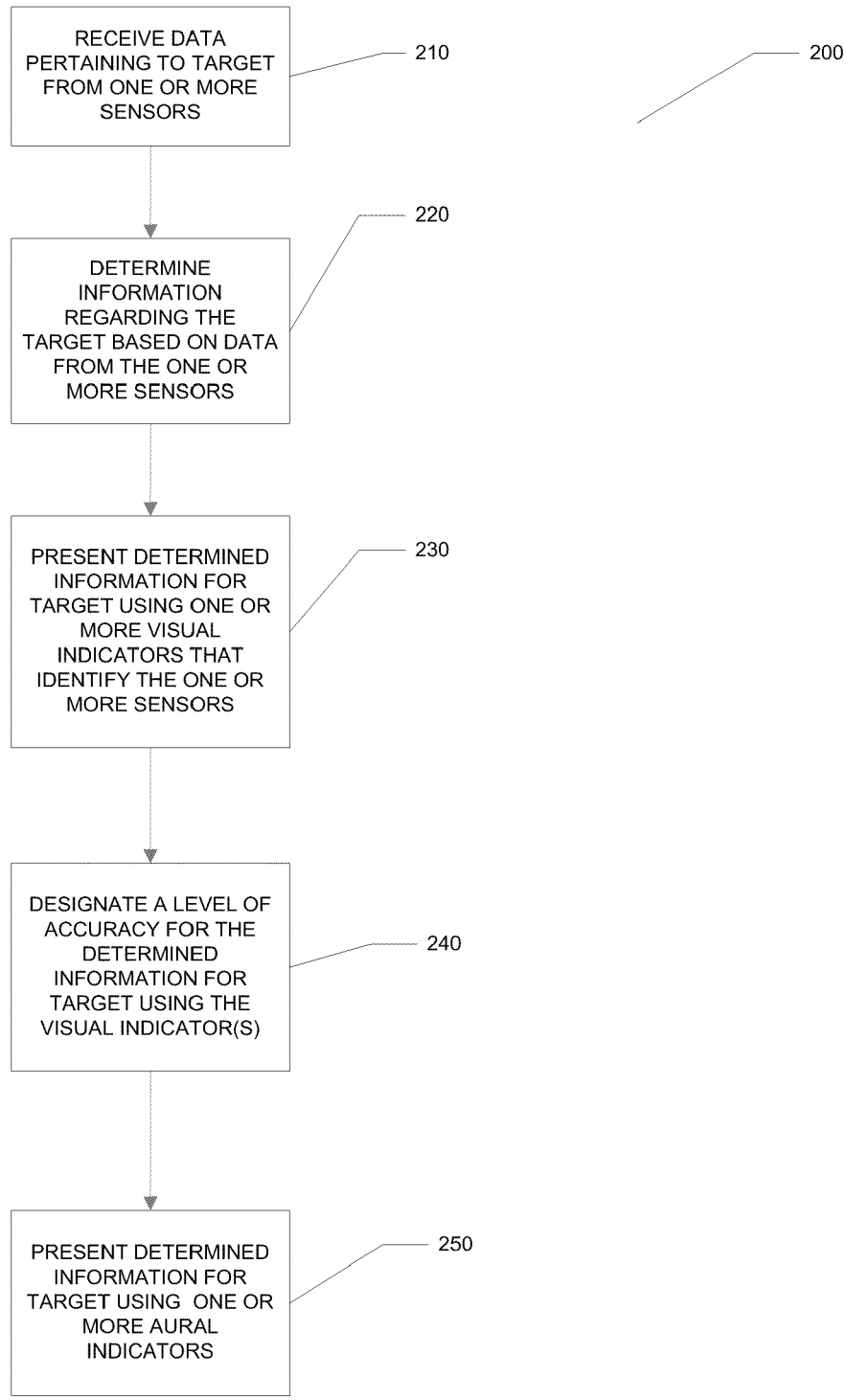
FIG. 2 is a flow diagram depicting an exemplary process according to various aspects of the present invention.

An exemplary method performed by a CAS according to an aspect of the present invention is depicted in FIG. 2. Any combination and/or subset of the elements of the method 200 depicted in FIG. 2 may be practiced in any suitable order and in conjunction with any system, device, and/or process. The method 200 can be implemented in any suitable manner, such as through software operating on a CAS computer system, such as the CAS computer 100 depicted in FIG. 1 and discussed previously.

In method 200, a CAS receives data from one or more sensors (210) and determines information regarding the target (e.g., the position of the target, bearing to the target, range to the target, heading of the target, threat level posed by the target, a collision avoidance maneuver to avoid the target, whether the target is cooperative or non-cooperative, and/or any other desired information) based on the data from the one or more sensors (220). Some or all of the determined information for the target is presented (e.g., via a display in communication with the CAS) using one or more visual indicators that identify the one or more sensors (230). The visual indicator(s) may indicate the level of accuracy associated with the presented information (such as the target's position, bearing, range, and/or heading) (240). The visual indicator(s) may also convey any other desired information regarding the target, such as a threat level posed by the target as well as a collision avoidance maneuver. The CAS may additionally present any of the determined information using one or more aural indicators (250).

In the exemplary process according to aspects of the present invention depicted in FIG. 2, data pertaining to a target is received from one or more sensors by a CAS (210). The data may be received from any number of different sensors. The sensors may be separate, federated systems in communication with the CAS. Additionally, sensors may be integrated with each other, the CAS, or other systems and devices. Data received from the sensor(s) may include any suitable information in any format, and the data may be received by the CAS in any manner. Data pertaining to the target may be received from some or all of a plurality of sensors in communication with the CAS computer 100. For example, in the exemplary system depicted in FIG. 1, the passive radar system 150 and active radar system 160 may provide data on a target at longer ranges and/or in low visibility conditions, while the optical sensor 145 and infrared sensor 155 may not be able to detect the target at such ranges and/or in conditions.

The CAS determines information on the target based on the data from one or more sensors (220). The CAS may utilize data from multiple sensors to determine the target's position, heading, speed, velocity, relative altitude, bearing to the target, and/or any other desired information. As used herein, a "sensor" is any system, device, or other data source capable of providing information on a target. Accordingly, as shown in FIG. 1, the target transponder 130, acoustic sensor 140, optical sensor 145, passive radar system 150, infrared sensor 155 and active radar system 160 may all be considered a "sensor" since each may provide data pertaining to the target. A CAS operating in conjunction with the present invention can use data from multiple sources and pertaining to the same target to determine information for the target, as well as to increase the accuracy of such determined information. As is discussed further below, a pilot who knows the accuracy level of information for a target may be able to make better decisions (e.g., in avoiding the target) than where the accuracy level of the information for a target is not known.

The CAS may determine information for a target in any desired manner. In one embodiment of the present invention, for example, the CAS may attempt to correlate data from multiple sensors to determine information for the target. As used herein, data from multiple sources are considered to be "correlated" when it is determined that the data from the sources relates to the same object (e.g., a target aircraft) and are considered to be "uncorrelated" when it is determined that the data from the sources does not relate to the same object. For example, data from a transponder on a target aircraft can be correlated with data from an acoustic sensor and optical sensor when both the acoustic sensor and optical sensor provide data relating to the target aircraft. In another example, data from a transponder on a target aircraft can be correlated to data from an acoustic sensor relating to the target aircraft, but would be uncorrelated to data from an infrared sensor that does not relate to the target aircraft. As is discussed further below, because some sensors may be able to detect a target in certain circumstances while others cannot, pilots viewing information on a target may find it useful to know which sensor(s) are providing information on a target. A more detailed discussion of methods for correlating data from multiple sensors may be found in U.S. patent application Ser. No. 12/011,200, from which this application claims priority and incorporates by reference in its entirety. Additionally, a CAS operating in conjunction with systems and methods of the present invention may determine any other information on a target in any other suitable manner.

In one embodiment of the present invention, for example, the CAS may determine a collision avoidance maneuver and present the collision avoidance maneuver to the pilot. The collision avoidance maneuver may include a horizontal maneuver, vertical maneuver, or combination of the two. For example, to address situations where vertical guidance can not be provided, the CAS may provide horizontal guidance based on range between own ship and a target, bearing to the target, and the rate at which the bearing is changing. FIG. 3 illustrates an example where two aircraft (own ship 310 and target/intruder 320) are closing head on with a horizontal separation of S. For simplicity of explanation, the aircraft are assumed to be traveling at the same rate and at the same altitude; therefore the closest point of approach (CPA) will occur exactly half way between the starting points of the two aircraft. As the aircraft approach each other it can be seen that the bearing changes more rapidly. When the intruder 320 is at a different altitude from the own ship 310, the principle still applies, although the delta altitude will introduce an apparent slowing of the intruder aircraft 320 since the range to the intruder 320 is actually composed of both the vertical and horizontal separations.

In another embodiment of the present invention, limitations in aircraft performance capability may be used in determining a collision avoidance maneuver. For example, the CAS may use a performance limit signal input provided by flight management computer that signifies when an aircraft has reached an altitude where it can no longer achieve a particular climb rate (e.g., 1500 feet per minute). The CAS may then compensate for aircraft performance by providing an alternate recommended maneuver. A CAS operating in accordance with the present invention may be configured to utilize performance limit inputs pertaining to the ability of the aircraft to climb (i.e., when the collision avoidance maneuver has a vertical component). Additionally, a CAS operating in accordance with the present invention may also utilize performance limitations that would prevent the aircraft from turning right or left in order to adjust a collision avoidance maneuver with a horizontal component. The ability of the present invention to issue collision avoidance maneuvers with both horizontal and vertical components can provide significant advantages over conventional collision avoidance systems that only issue collision avoidance maneuvers with a vertical component (e.g., climb or dive).

The CAS may utilize the parameters of the aircraft in any suitable manner to determine a collision avoidance maneuver. For example, the CAS may analyze parameters for the aircraft that affect its turn rate, such as the aircraft's air speed and bank angle. The aircraft limits for air speed and bank angle may be pre-programmed into the CAS for use in determining the collision avoidance maneuver. During operation, the current air speed and bank angle of the aircraft can be used by the CAS to provide realistic guidance while taking into consideration the limitations of the aircraft. In the case where the aircraft is capable of maneuvering in either the vertical or horizontal planes, the CAS can select the best maneuver to maximize the separation from the intruder. Alternatively, the logic can select vertical or horizontal maneuvers based on the expected integrity of the data, or by any other factor indicating that some data is known with less accuracy or certainty.

FIG. 4 provides a graph of a detailed example of the relationship between bearing and the CPA for the two aircraft (310, 320) in FIG. 3. In this example, the intruder 320 and own ship 310 start 2 miles away from the CPA and are separated horizontally by 0.5 miles. The aircraft are both traveling at the same speed, although the actual speed is not material to the explanation. It can be seen that both the bearing and the bearing rate of change continue to change faster as the aircraft approach each other. Where accurate range and bearing information is available for the intruder 320, the horizontal separation can be calculated as $S = R \sin(\theta)$ for the special case when the altitudes of both aircraft are equal. Knowing the speed of own aircraft, the range to the intruder, intruder bearing, and the rate of change of intruder bearing allows an estimate of the speed of the intruder to be derived as well as the heading of the intruder. This information may thus lend itself to providing a horizontal resolution advisory (i.e., collision avoidance maneuver) to the operator of the own ship 310.

In another example, if an intruder track is initiated at 2 miles at a certain bearing, and as it gets closer the bearing doesn't change, it can be determined that the intruder is either approaching straight at own aircraft or turning into its path. The actual bearing of the intruder may determine whether the collision avoidance annunciation is given to turn left or right to avoid it. Horizontal advisories may also be combined with vertical advisories in accordance with the present invention.

The CAS presents information regarding the target using one or more visual indicators that identify one or more sensors providing data pertaining to the target (230). Any number (and combination) of symbols, icons, pictures, colors, shapes, alphanumeric characters, fonts, and/or any other desired visual indicators may be used in conjunction with the present invention. FIG. 5 illustrates exemplary visual indicators that may be used to identify a target, as well as which sensor(s) are detecting the target. For example, icons 505, 510, 515, and 520 are used to identify a target that is only detected through one sensor, namely a target transponder 130 that provides information on the target aircraft to the CAS computer system 100 through the CAS transceiver 120. Similarly, icons 525 and 530 identify a target that is only detected by a single sensor, namely a radar system (e.g., passive radar system 150 or active radar system 160). Icons 535, 540, 545, and 550 are used to identify a target detected using both the target transponder 130 and radar system (150, 160).

A visual indicator may also designate whether a target is a cooperative target or non-cooperative target. For example, referring again to FIG. 5, cooperative traffic (i.e., targets providing data through the target's transponder) is displayed with standard CAS symbology (i.e., icons 505, 510, 515, and 520). Non-cooperative traffic (i.e., targets without a transponder) that is only detected by non-cooperative detection systems (e.g., passive radar system 150 or active radar system 160, but not from signals from transponder 130) is displayed with a symbol different from the standard CAS symbology (i.e., icons 525, and 530). Cooperative traffic detected by multiple sensors (i.e., using both the target transponder 130 and radar system 150 or 160) may be displayed with yet another set of symbols (i.e., icons 535, 540, 545, and 550). The unique visual indicators assigned to targets based on the sensor(s) detecting the target allows a pilot to quickly and easily differentiate between cooperative and non-cooperative traffic, and to identify which sensors are detecting the target.

A visual indicator may designate a threat level posed by the target to an aircraft hosting a CAS (i.e., "own ship"). The colors of the exemplary visual indicators depicted in FIG. 5 are indicative of different threat levels according to industry standards. For example, non-threat traffic (i.e., a target that, if it continues to follow its current path, will not create a potential collision and no changes need to be made to the flight path of own ship to avoid it) is represented by cyan. A different color of symbol is used for targets that have crossed a certain threat threshold and present a potential hazard. If the CAS determines that a target presents a potential hazard and changes to the flight path are required to avoid it, the color of the symbol can be changed to a color representing a greater danger (e.g., amber or red). In the exemplary icons depicted in FIG. 5, and in accordance with industry standards, amber is used to represent a traffic advisory ("TA") while red represents a resolution advisory ("RA"). A visual indicator may designate a threat level posed by a target using any other number and combination of colors, shapes or other visual indicators.

A visual indicator may designate a collision avoidance maneuver. The visual indicator may designate any suitable collision avoidance maneuver, such as a horizontal maneuver, vertical maneuver, or combination of the two. FIG. 6 depicts an exemplary visual indicator for providing a horizontal avoidance maneuver. In this exemplary embodiment of the present invention, an arrow-head symbol 610 (such as icons 525 and 530 in FIG. 5) is displayed in conjunction with an arrow 620 (pointing to the right) underneath the symbol 610, representing a target for which own ship should turn right to avoid. A visual indicator may be used to convey any desired information regarding the collision avoidance maneuver. For example, a turn rate could be represented by the length of the arrow 620. A visual indicator may also designate a level of urgency for a collision avoidance maneuver. For example, the length of the arrow 620 may be increased, indicating that a more aggressive turn is required. Alternately, the arrow 620 could blink at a rate that is indicative of the urgency of the action required (e.g., the blink rate could increase when a more aggressive maneuver is required). A visual indicator may convey any other desired information, such as the bearing of the target, range to the target, the target's heading, the target's position, the target's speed, the target's velocity, relative altitude and/or any other information.

A visual indicator may convey a level of accuracy of the data measured by the system of the present invention to track another aircraft's flight (e.g. a target's position, heading, and/or bearing). For example, if a non-cooperating intruder is near the maximum range of a sensor (such as an active radar system 160), there may be limited confidence in the accuracy of the bearing and range data obtained by the active radar sensor 160. Therefore, in one embodiment of the present invention, a calculation is performed to determine the confidence or probable accuracy of the location data of the target from the active radar system 160, and the displayed visual indicators are adjusted based on that confidence level.

For example, if the arrow heads 525 and 530 shown in FIG. 5 indicate a non-cooperative target, and if the radar signal return that identifies the intruder falls below a predetermined threshold (such as a particular signal strength or signal to noise ratio), the arrow 620 may be modified to indicate a reduction in certainty of the intruding target's location, heading, bearing, or any combination of other relevant flight parameters. The manner in which a visual indicator is modified may be related to the amount of uncertainty associated with the data from the sensor(s). For example, the arrow head 610 and/or arrow 620 symbols may be stricken with hash or crosshatch lines as shown in FIG. 7A, with the width, density, or boldness of the crosshatch indicating the relative certainty or uncertainty of the accuracy of the radar return data. Likewise, FIG. 7B shows display symbols with a central area voided in proportion to the level of uncertainty in the accuracy of the radar return data (or other data source). Further, FIG. 7C depicts typographical indicia that may be added to the symbols to indicate levels of uncertainty of data accuracy. Those of skill in the relevant arts understand that a combination of the methods shown in FIGS. 7A-7C may be used to depict relative certainty in the accuracy of intruder data, and alternate techniques such as adding a dashed line in proximity to the perimeter of the symbol may also be used. In the alternative, one type of modification may be used to show uncertainty in the intruder's range, and another modification type could be used to depict the relative confidence in the intruder's heading. The uncertainty associated with the accuracy of data from one or more sensors may be conveyed using any other desired visual indicator(s).

In addition to presenting information pertaining to a target using visual indicators as described above, such information may also be presented using one or more aural indicators (250). Aural indicators may be used in conjunction with (as well as separately from) one or more visual indicators. In one embodiment of the present invention for example, aural and visual annunciations are used to alert the pilot to the status of air traffic. Any number and type of aural indicator may be used in conjunction with the present invention, such as one or more tones and/or aural annunciations. Aural annunciations may include, for example, instructions to perform a collision avoidance maneuver, such as "bank right," "bank left," "turn right," "turn left," "maintain heading," or "don't turn." An aural annunciation may be used to convey any desired information, such as the position of the target, the range to the target, the bearing to the target, the heading of the target, the speed of the target, a threat level posed by the target, and the velocity of the target.

The particular implementations shown and described above are illustrative of the invention and its best mode and are not intended to otherwise limit the scope of the present invention in any way. Indeed, for the sake of brevity, conventional data storage, data transmission, and other functional aspects of the systems may not be described in detail. Methods illustrated in the various figures may include more, fewer, or other steps. Additionally, steps may be performed in any suitable order without departing from the scope of the invention. Furthermore, the connecting lines shown in the various figures are intended to represent exemplary functional relationships and/or physical couplings between the various elements. Many alternative or additional functional relationships or physical connections may be present in a practical system.

Changes and modifications may be made to the disclosed embodiments without departing from the scope of the present invention. These and other changes or modifications are intended to be included within the scope of the present invention, as expressed in the following claims.

What is claimed is:

1. A method comprising:
receiving, by a Collision Avoidance System (CAS), data pertaining to a target from one or more sensors of a plurality of sensors;
determining, by the CAS, a position of the target based on the data from the one or more sensors; and
presenting, by the CAS, the position of the target using one or more visual indicators that identify the one or more sensors;
wherein at least one of the one or more visual indicators designates whether the target is a cooperative target or non-cooperative target.

2. The method of claim 1, further comprising determining, by the CAS, at least one of a bearing to the target, a range to the target, a heading of the target, a speed of the target, a relative altitude of the target, and a velocity of the target.

3. The method of claim 2, further comprising presenting, by the CAS, at least one of the bearing to the target, the range to the target, and the heading of the target using the one or more visual indicators.

4. The method of claim 2, further comprising presenting, by the CAS, at least one of the position of the target, the range to the target, the bearing to the target, the heading of the target, the speed of the target, the relative altitude of the target, a threat level posed by the target, and the velocity of the target using one or more aural indicators.

5. The method of claim 1, wherein at least one of the one or more visual indicators designates a threat level posed by the target.

6. The method of claim 1, wherein at least one of the one or more visual indicators designates a collision avoidance maneuver.

7. The method of claim 6, wherein at least one of the one or more visual indicators further designates a level of urgency for the collision avoidance maneuver.

8. The method of claim 6, wherein the collision avoidance maneuver is determined in accordance with a performance limitation associated with an aircraft coupled to the CAS.

9. The method of claim 6, wherein the collision avoidance maneuver includes at least one of a horizontal maneuver and a vertical maneuver.

10. The method of claim 1, wherein at least one of the one or more visual indicators designates a level of accuracy associated with the determined position of the target.

11. A collision avoidance system (CAS) comprising:
a user interface;
a plurality of sensors; and
a computer system in communication with the user interface and the plurality of sensors, wherein the computer system comprises:
a processor; and
a memory storing instructions that, when executed by the processor, cause the processor to:
receive data pertaining to a target from one or more sensors of the plurality of sensors;
determine a position of the target based on the data from the one or more sensors; and
present, through the user interface, the position of the target using one or more visual indicators that identify the one or more sensors;
wherein at least one of the one or more visual indicators designates whether the target is a cooperative target or non-cooperative target.

12. The system of claim 11, wherein the memory further stores instructions to determine at least one of a bearing to the target, a range to the target, a heading of the target, a speed of the target, a relative altitude of the target, and a velocity of the target.

13. The system of claim 12, wherein the memory further stores instructions to present at least one of the bearing to the target, the range to the target, the heading of the target, the speed of the target, the relative altitude of the target, and the velocity of the target through the user interface using the one or more visual indicators.

14. The system of claim 12, wherein the memory further stores instructions to present at least one of the position of the target, the range to the target, the bearing to the target, the heading of the target the speed of the target, the relative altitude of the target, a threat level posed by the target, and the velocity of the target through the user interface using one or more aural indicators.

15. The system of claim 11, wherein at least one of the one or more visual indicators designates a threat level posed by the target.

16. The system of claim 11, wherein at least one of the one or more visual indicators designates a collision avoidance maneuver.

17. The system of claim 16, wherein at least one of the one or more visual indicators further designates a level of urgency for the collision avoidance maneuver.

18. The system of claim 16, wherein the collision avoidance maneuver is determined in accordance with a performance limitation associated with an aircraft coupled to the CAS.

19. The system of claim 16, wherein the collision avoidance maneuver includes at least one of a horizontal maneuver and a vertical maneuver.

20. The system of claim 11, wherein at least one of the one or more visual indicators designates a level of accuracy associated with the determined position of the target.

21. A method comprising:
(i) receiving data pertaining to a target from a plurality of sensors by a Collision Avoidance System (CAS);
(ii) determining, using the CAS:
(a) a position of the target based on the data from one or more sensors of the plurality of sensors; and
(b) whether the target is a cooperative target or non-cooperative target;
(iii) presenting, using the CAS, the position of the target using one or more visual indicators, wherein the one or more visual indicators further designate:
(a) which of the plurality of sensors provided data to determine the position of the target; and
(b) whether the target is a cooperative target or non-cooperative target.

22. The method of claim 21, further comprising determining, using the CAS, at least one of a bearing to the target, a range to the target, a heading of the target, a speed of the target, a relative altitude of the target, and a velocity of the target.

23. The method of claim 22, further comprising presenting, using the CAS, at least one of the bearing to the target, the range to the target, the heading of the target, the speed of the target, a relative altitude of the target, and the velocity of the target using the one or more visual indicators.

24. The method of claim 22, further comprising presenting, using the CAS, at least one of the position of the target, the range to the target, the bearing to the target, the heading of the target, the speed of the target, a relative altitude of the target, a threat level posed by the target, and the velocity of the target using one or more aural indicators.

25. The method of claim 21, wherein at least one of the one or more visual indicators designates a threat level posed by the target.

26. The method of claim 21, wherein at least one of the one or more visual indicators designates a collision avoidance maneuver.

27. The method of claim 26, wherein at least one of the one or more visual indicators further designates a level of urgency for the collision avoidance maneuver.

28. The method of claim 26, wherein the collision avoidance maneuver is determined in accordance with a performance limitation associated with an aircraft coupled to the CAS.

29. The method of claim 26, wherein the collision avoidance maneuver includes at least one of a horizontal maneuver and a vertical maneuver.

30. The method of claim 21, wherein at least one of the one or more visual indicators designates a level of accuracy associated with the determined position of the target.

31. A collision avoidance system (CAS) comprising:
   a user interface;
   a plurality of sensors; and
   a computer system in communication with the user interface and the plurality of sensors, wherein the computer system comprises:
   a processor; and
   a memory storing instructions that, when executed by the processor, cause the processor to:
   (i) receive data pertaining to a target from the plurality of sensors;
   (ii) determine:
   (a) a position of the target based on the data from one or more sensors of the plurality of sensors; and
   (b) whether the target is a cooperative target or non-cooperative target;
   (iii) present, through the user interface, the position of the target using one or more visual indicators, wherein the one or more visual indicators further designate:
   (a) which of the plurality of sensors provided data to determine the position of the target; and
   (b) whether the target is a cooperative target or non-cooperative target.

32. The system of claim 31, wherein the memory further stores instructions to determine at least one of a bearing to the target, a range to the target, a heading of the target, a speed of the target, a relative altitude of the target, and a velocity of the target.

33. The system of claim 32, wherein the memory further stores instructions to present at least one of the bearing to the target, the range to the target, the heading of the target, the speed of the target, the relative altitude of the target, and the velocity of the target through the user interface using the one or more visual indicators.

34. The system of claim 32, wherein the memory further stores instructions to present at least one of the position of the target, the range to the target, the bearing to the target, the heading of the target, the speed of the target, the relative altitude of the target, a threat level posed by the target, and the velocity of the target through the user interface using one or more aural indicators.

35. The system of claim 31, wherein at least one of the one or more visual indicators designates a threat level posed by the target.

36. The system of claim 31, wherein at least one of the one or more visual indicators designates a collision avoidance maneuver.

37. The system of claim 36, wherein at least one of the one or more visual indicators further designates a level of urgency for the collision avoidance maneuver.

38. The system of claim 36, wherein the collision avoidance maneuver is determined in accordance with a performance limitation associated with an aircraft coupled to the CAS.

39. The system of claim 36, wherein the collision avoidance maneuver includes at least one of a horizontal maneuver and a vertical maneuver.

40. The system of claim 31, wherein at least one of the one or more visual indicators designates a level of accuracy associated with the determined position of the target.

* * * * *